(12) United States Patent
Mills

(10) Patent No.: US 9,347,849 B2
(45) Date of Patent: May 24, 2016

(54) METHOD AND APPARATUS FOR DETERMINING THE THERMAL STATUS OF FUEL IN A LINE LEAK DETECTION SYSTEM

(71) Applicant: DELAWARE CAPITAL FORMATION, INC., Wilmington, DE (US)

(72) Inventor: Anthony Mills, Naperville, IL (US)

(73) Assignee: OPW Fuel Management Systems, Inc., Hodgkins, IL (US)

( * ) Notice: Subject to any disclaimer, the term of this patent is extended or adjusted under 35 U.S.C. 154(b) by 250 days.

(21) Appl. No.: 14/347,501

(22) PCT Filed: Sep. 26, 2012

(86) PCT No.: PCT/US2012/057273
§ 371 (c)(1),
(2) Date: Mar. 26, 2014

(87) PCT Pub. No.: WO2013/049157
PCT Pub. Date: Apr. 4, 2013

(65) Prior Publication Data
US 2014/0283582 A1        Sep. 25, 2014

Related U.S. Application Data

(60) Provisional application No. 61/539,684, filed on Sep. 27, 2011.

(51) Int. Cl.
*G01M 3/28*    (2006.01)
*G01M 3/26*    (2006.01)
*G01M 3/00*    (2006.01)

(52) U.S. Cl.
CPC ............ *G01M 3/2892* (2013.01); *G01M 3/002* (2013.01); *G01M 3/26* (2013.01)

(58) Field of Classification Search
CPC .... G01M 3/28; G01M 3/2807; G01M 3/2892
USPC ...................................................... 73/40.5 R
See application file for complete search history.

(56) References Cited

U.S. PATENT DOCUMENTS 5,072,621 A  *  12/1991  Hasselmann ....... G01M 3/2892
                                                                  73/40.5 R
5,315,862 A  *   5/1994  Hasselmann ....... G01M 3/2892
                                                                  73/40.5 R (Continued)

FOREIGN PATENT DOCUMENTS

WO    WO 2007084909 A1  *  7/2007   .......... G01M 3/2892

OTHER PUBLICATIONS

International Searching Authority, search report and written opinion issued in corresponding PCT application No. PCT/US2012/05723, dated Dec. 5, 2012, 8 pages.

(Continued)

*Primary Examiner* — Peter Macchiarolo
*Assistant Examiner* — Nathaniel Kolb
(74) *Attorney, Agent, or Firm* — Wood, Herron & Evans, LLP

(57) ABSTRACT

A method of determining the thermal status of fuel in a fuel distribution system (10) includes pressurizing the distribution line (16) by activating a submersible pump (14) in an underground storage tank (12). Once the distribution line (16) is pressurized, the pump (14) is switched off, and the reverse flow rate out of the distribution line back into the tank (12) is monitored. The test is repeated after a period of time, and the reverse flow rates of the separate tests are compared to determine if the fuel in the distribution line (16) is in thermal stability with the surrounding environment based on flow rate changes between tests.

10 Claims, 7 Drawing Sheets

(56) References Cited

U.S. PATENT DOCUMENTS

| | | | | |
|---|---|---|---|---|
| 5,918,268 | A | * 6/1999 | Lukas | G01M 3/2892 340/605 |
| 8,316,695 | B2 | * 11/2012 | Jarvie | G01M 3/2892 137/398 |
| 2007/0163331 | A1 | * 7/2007 | Jarvie | G01M 3/3245 73/49.2 |
| 2009/0199927 | A1 | 8/2009 | Kane et al. | |
| 2010/0281953 | A1 | * 11/2010 | Jarvie | G01M 3/2892 73/40.5 R |

OTHER PUBLICATIONS

European Patent Office, Supplementary European Search Report issued in Application No. EP 12 83 7018 dated May 7, 2015.

* cited by examiner

METHOD AND APPARATUS FOR DETERMINING THE THERMAL STATUS OF FUEL IN A LINE LEAK DETECTION SYSTEM

TECHNICAL FIELD

This invention relates to leak detection and has particular application to the detection of leakage from pressurized fuel delivery lines in dispensing operations, such as gas stations and the like.

BACKGROUND

Leakage of petroleum products, such as gasoline, into the environment may be damaging to surrounding soil and water. Because the amount of environmental damage caused by the leak depends in part on the total amount of product lost, the environmental clean up or remediation will tend to be more costly and time consuming the longer a leak is allowed to continue. Thus, it is desirable to identify leaks as early as possible.

In a dispensing operation, such as at a gas station, fuel is typically stored in underground storage tanks ("UST") from where it is pumped through various conduit lines to one or more above ground dispensing units for dispensing into motor vehicles or the like. Fuel leaks from the UST or the interconnecting conduit lines can cause significant environmental damage. The United States Environmental Protection Agency ("EPA"), as well as regulatory bodies in many other countries, have set certain standards for the detection and prevention of environmental leaks of fuel. For example, as this application is filed, the EPA requires detection methods sufficient to detect volumetric line leak rates of as little as 0.1 gallons per hour ("GPH"). Accordingly, fuel dispensing equipment manufacturers have been developing methods and systems to detect leaks with sufficient accuracy to meet EPA standards in this regard.

A number of devices operating on a variety of physical principles have been proposed to meet these standards, thereby warning of leaks and providing means for stopping the leaks as quickly as possible to reduce the impact on the surrounding environment. By way of example, in fuel dispensing operations, one such type of leak detector device includes a valve disposed in the conduit line to isolate a downstream section of the conduit line from the UST when fuel is not being dispensed. The leak detector valve includes a valve element held in place against an associated valve seat by a spring or other device so that the valve is normally in a closed position. When the pressure drop across the valve element (e.g., in a forward direction) reaches a threshold, commonly referred to as the cracking pressure, the valve element is forced open by the positive pressure across the valve, allowing fluid to flow through the valve and toward the dispensing unit so that fuel may be dispensed to a motor vehicle or the like. When the dispensing unit shut off valve or nozzle is closed, or the dispensing operation is otherwise terminated, the forward pressure drop across the valve element abates, and the valve returns to a closed state so as to prevent any fuel from passing through the valve.

The leak detection function of these devices may be provided by a bypass line around the primary valve such that one end thereof is in fluid communication with a first side of the valve (e.g., downstream side) and the other end of the bypass line is in fluid communication with a second side of the valve (e.g., upstream side). A flow detector is typically disposed in the bypass line so as to detect any flow therethrough. To allow relatively small leaks in the conduit line to be detected, the bypass line typically has a relatively small cross-sectional area relative to the primary flow path through the valve.

Conduit line leak detection systems include pressure decay systems and volumetric based systems. In a pressure decay system, the line is pressurized by turning on a submersible turbine pump ("STP"), located in the UST for example, until the conduit line is fully pressurized. The STP is then shut off, with a check valve between the STP and the leak detector maintaining pressure on the upstream side of the leak detector by preventing fuel from flowing back into the UST. Ideally, there is no leak in the conduit line and thus no flow through the bypass line. However, if there is a leak in the conduit line downstream of the leak detector valve, the pressure in the downstream conduit line will steadily decrease. This pressure drop will, in turn, cause fluid to flow from the upstream side of the valve (i.e., the high pressure side) to the downstream side of the valve (i.e., the low pressure side) through the bypass line. The flow detector will then detect this flow through the bypass line and cause an alarm condition, which may shut down the dispensing system to prevent any further leakage of fuel from the conduit line to the surrounding environment.

Volume based systems work on a similar principle as described above for a pressure decay system. However, volume based systems keep the STP running during the leak test to maintain constant pressure on the upstream side of the leak detector. During the leak test, the system monitors the flow of fluid through the bypass line. If there are no leaks in the conduit line, the flow rate will drop during the test as the pressure equalizes on both sides of the leak detector, with the flow rate ultimately reaching zero. However, if there is a leak in the conduit line, the flow rate will settle on a steady non-zero value equal to the rate fluid is being lost from the conduit line.

Both pressure decay and volume based systems are conventionally designed to prevent reverse fluid flow within the bypass line, either by the presence of a check valve within the conduit line or by maintaining positive pressure within the line during leak detection. The leak detector has therefore traditionally been used to detect fluid flow only in the forward direction, and known methods of leak detection rely on these positive flow measurements.

Leak detection devices operating on the basic principles outlined above are generally known in the art. By way of example, U.S. Pat. No. 3,940,020 to McCrory et al.; U.S. Pat. No. 3,969,923 to Howell; U.S. Pat. No. 5,014,543 to Franklin et al.; U.S. Pat. Nos. 5,072,621 and 5,315,862 to Hasselmann; and U.S. Pat. No. 5,918,268 to Lukas et al. generally show a valve, a bypass line, and some type of flow detector for detecting flow through the bypass line. These references differ primarily in the flow detector used to detect flow through the bypass line. For example, McCrory et al. and Howell use a reed switch in conjunction with a magnetized piston to sense flow through the bypass line. Franklin et al. use a rotometer to measure the fluid flow through a bypass line. Moreover, Lukas et al. utilize a thermal flow meter that operates on generally well known principles for determining the flow through the bypass line.

Another example of a leak detector using a bypass line is described in U.S. Patent Pub. No. 20100281953, entitled "Line Leak Detector and Method of Using Same", the disclosure of which is incorporated herein by reference in its entirety, and assigned to the assignee of the present application.

While the methods of leak detection described above generally work for their intended purpose, there are some drawbacks that make accurate detection of conduit line leaks problematic in a typical fuel dispensing operation. For example, the fuel in the UST is often at a different temperature than the ground surrounding the conduit line, so that immediately after a fuel dispensing operation, the fuel in the conduit line will not be in thermal equilibrium with its surrounding environment. In cases where the fuel is at a higher temperature than the ground surrounding the conduit line, the volume of the fuel will contract as its temperature drops over time, lowering the pressure in the conduit line. This drop in pressure may cause fuel to flow through the bypass line, potentially triggering a false leak alarm. Conversely, if the fuel in the UST is at a lower temperature than the ground surrounding the conduit line, the volume of the fuel in the line will undergo thermal expansion as the fuel warms. This volumetric expansion may potentially conceal or reduce the apparent magnitude of a leak by reducing the flow through the bypass line required to replace the fuel lost due to the leak. Thus, a precision line leak test typically cannot be performed with sufficient accuracy to detect a 0.1 GPH leak until the fuel in the conduit line is closer in temperature to the surrounding environment. When the fuel's temperature is close enough to that of the environment that it no longer disrupts the 0.1 GPH line leak test, say that the fuel has reached "thermal stability".

Because the temperature of the fuel in the conduit line is typically disturbed whenever a fuel dispensing event occurs, operators may not be able to conduct accurate conduit line leak tests for a significant period of time after a customer purchases fuel. The amount of time required for the fuel to reach thermal stability will vary depending on the initial temperature difference, the thermal mass of the fuel contained in the conduit line, and possibly other factors. In any event, it may be as long as several hours for the fuel to reach stability. This uncertainty about the thermal relationship between the fuel in the conduit line and its surrounding environment may result in having to wait an artificially long time before conducting a line leak test in order to ensure that the fuel temperature has sufficiently stabilized. Waiting significantly longer than required by the actual temperature differences between the fuel and its surrounding environment to conduct a line leak test poses a significant problem for fuel dispensing operations that operate continuously, such as gas stations along busy interstate highways, since fuel may not be dispensed during the waiting period.

Additionally, a line leak test may typically take as much as twelve hours to perform, during which fuel cannot be dispensed. As this represent a significant opportunity cost for a busy gas station, it is critical that the test only be initiated when it will yield accurate results.

Consequently, there is a need for improved methods of line leak detection that cannot only detect small leaks in a fluid conduit line so as to meet or exceed EPA standards, but that can also determine when the fuel in the conduit line has sufficient thermal stability to allow accurate leak detection to be conducted.

SUMMARY

To address these and other drawbacks, a method for determining when the fuel in a conduit line has reached a sufficient level of thermal stability to allow an accurate line leak test is provided. A method of detecting a leak in a fluid conduit line includes providing a valve within the conduit line. The valve includes a valve seat and a valve element movable relative to the valve seat between an opened position wherein fluid is permitted to flow through the valve, and a closed position wherein fluid is prevented from flowing through the valve. A bypass line is provided and includes a first end in fluid communication with a first side of the valve and a second end in fluid communication with a second side of the valve. A fluid flow detector is operatively coupled to the bypass line and configured to detect the flow of fluid therethrough in both forward and reverse directions.

To determine the thermal status of the fuel in the conduit line in relation to the surrounding environment, the conduit line between the leak detector and the dispensing unit is pressurized by turning on the pump while the dispensing unit is shut off. Once the system is pressurized, the pump is switched off, so that the pressure on the upstream side of the leak detector drops back to its quiescent level. The pressure on the downstream side of the leak detector causes fuel to flow in a reverse direction through the leak detector bypass line back into the UST until the downstream pressure is in equilibrium with the upstream pressure. The reverse flow rate verses time of the fuel through the leak detector bypass line is monitored and used to produce a reverse flow rate signature for that pressurization/depressurization sequence. After a period of time, during which the temperature of the fuel in the conduit line may become more stable, the pressurization and reverse flow rate monitoring steps are repeated. Further repetitions are repeated at intervals as necessary to accumulate data The fuel in the conduit line may initially be at substantially the same temperature as the ground surrounding the conduit line, so that the fuel's temperature is stable with its surrounding environment. The fuel will thus not change temperature during the reverse flow test, and there will correspondingly be no little of the flow rate due to thermal expansion or contraction of the fuel in the conduit line. Because the fuel is thermally stable, the reverse flow rate signature will also be relatively constant between the test sequences, and by comparing the reverse flow signatures of the multiple tests, a determination may be made that the fuel is at the same temperature as the ground surrounding the conduit line.

The fuel in the conduit line may instead initially be at a temperature that is lower than the ground surrounding the conduit line. The temperature of the fuel will thus be rising as it absorbs heat from the surrounding environment, resulting in thermal expansion of the fuel. This expansion will cause a reverse flow rate signature having a higher flow rate of fuel passing through the bypass line for a longer period of time than for fuel that is thermally stable. As with the previous example, the test sequence is repeated after a period of time. During the second test, the fuel will be warmer than it was during the first test, so that the temperature of the fuel will be closer to that of the ground surrounding the conduit line than in the first test. Thus, the rate of fuel warming, and thus thermal expansion, will be less during the second test, so that second reverse flow rate signature will have a reduced flow rate volume and duration as compared to the earlier test sequence. By repeating the test sequence and comparing reverse flow signatures over time, a determination can thus be made as to when the fuel in the conduit line is sufficiently close to a stable temperature to allow an accurate pressurized leak test to be performed.

Alternatively, the fuel in the conduit line may initially be at a temperature higher than the ground surrounding the conduit line. Thus, the fuel will be cooling as heat escapes to the surrounding environment, resulting in thermal contraction of the fuel. This thermal contraction will result in a reverse flow rate signature having a lower volume of fuel passing through the bypass line for a shorter period of time than for fuel that is thermally stable. The thermal contraction may also cause the reverse flow to turn into a forward flow during the flow rate monitoring step. When the reverse flow test sequence is repeated after a period of time, the fuel will have cooled so that it is closer to the temperature of the conduit line environment. As the temperature of the fuel approaches that of the conduit line environment, its rate of thermal contraction will be reduced, so that subsequent reverse flow rate signatures will have an increased flow rate and duration as compared to the earlier test sequences. By repeating the test sequence and comparing reverse flow signatures over time, a determination can be made as to when the fuel in the conduit line is sufficiently close to thermal stability to allow an accurate pressurized leak test to be performed.

The invention thus provides an accurate method of determining the thermal status of the fuel in the conduit line using existing components found in a typical leak detection system. The ability to actively determine the thermal status of the fuel in the conduit line may allow line leak testing to be performed with less dispensing down time, as well as providing more reliable line leak data.

BRIEF DESCRIPTION OF THE DRAWINGS

The accompanying drawings, which are incorporated in and constitute a part of this specification, illustrate embodiments of the invention and, together with a general description given above, and the detailed description given below, serve to explain various aspects of the invention.

DETAILED DESCRIPTION

Figure 1:
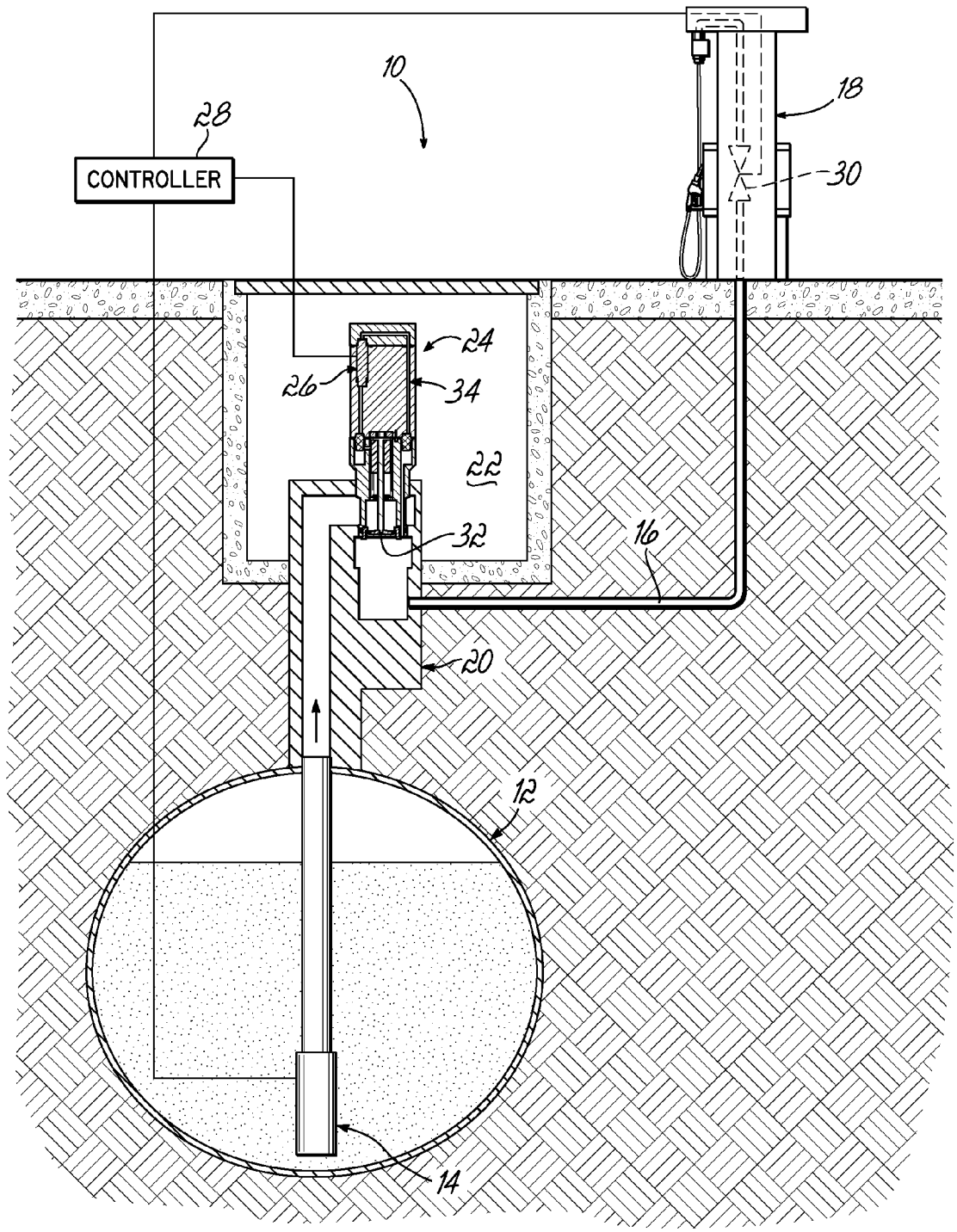
FIG. 1 is a diagrammatic illustration of an exemplary fuel dispensing system.

An exemplary fuel dispensing system 10 in accordance with embodiments of the invention is shown in FIG. 1, and generally includes an underground storage tank 12 for storing a fuel, a submersible pump 14 located in the tank 12, and a fluid conduit line 16 that transports the fuel under pressure to one or more dispensing units 18. Typically, the fluid conduit line 16 is coupled to the submersible pump 14 via a pump manifold 20 located external to tank 12, such as in a covered manway 22. A line leak detector 24 is disposed between the pump manifold 20 and fuel conduit line 16, and includes a fluid flow detector 26 adapted to detect the rate of fluid flow into and out of the conduit line 16. A controller 28 is in communication with the submersible pump 14, dispensing unit 18, and fluid flow detector 26, so as to provide control over the operation of the fuel dispensing system 10. To this end, the controller 28 is adapted to selectively activate the submersible pump 14 and open a dispenser unit shut off valve 30, so as to allow fuel to be dispensed from the dispensing unit 18 during a fueling event.

The leak detector 24 typically includes a primary flow path valve 32 and a bypass line 34, which work cooperatively to increase the sensitivity of the fluid flow detector 26 while maintaining the ability to flow large amounts of fuel during a fuel dispensing event. However, the leak detector 24 may be any device capable of detecting forward and reverse flow rates with sufficient precision so as to allow detection of a leak of 0.1 GPH or less.

If present, the primary path valve 32 controls fluid flow through a primary flow path, the valve 32 including an open position wherein fluid is permitted to flow through the valve 32, and a closed position wherein fluid is prevented from flowing through the valve 32 (closed position shown in FIG. 1). The valve 32 is adapted to open when fuel is dispensed from the dispensing unit 18 so as to provide a relatively unrestricted flow path between the tank 12 and the dispensing unit 18, and to close when fuel is not being dispensed, so that fuel flow through the leak detector 24 is directed through the bypass line 34. To this end, the primary path valve 32 is typically adapted to open in response to a pressure gradient across the valve in a forward direction exceeding a threshold known as the valve cracking pressure. The valve 32 then remains open until the pressure gradient across the valve 32 falls below another pressure threshold, which may be the same as or different than the cracking pressure.

In leak detectors employing primary flow path valve 32, the bypass line 34 provides an alternative bi-directional fluid flow path that bypasses or circumvents valve 32 so that a relatively small amount of fluid may flow in both forward and reverse directions between the tank 12 and the fluid conduit line 16 when the valve 32 is in the closed position, such as during a line leak test or reverse flow test. To this end, the bypass line 34 includes an inlet positioned upstream of the primary path valve 32, an outlet positioned downstream of the leak detector valve 32, and a fluid passageway extending therebetween. The inlet and outlet ends are thereby operatively coupled to the bypass line 34 so that they are in fluid communication with each other, thus allowing fluid to flow between the upstream and downstream sides of the leak detector 24. The fluid flow detector 26 is in electrical communication with the controller 28, and is configured to detect both the rate and direction of fluid flow through the bypass line 34 and to provide the detected flow rate data to the controller 28. The bypass line 34 typically has a relatively small cross sectional area as compared to the primary flow path in order to increase the sensitivity of the fluid flow detector 26 to relatively low flow rates. The smaller cross-sectional area increases the fluid flow velocity for a given volume of fluid flow per unit of time, thereby increasing the ability of the fluid detector 26 to accurately measure the low flow rates associated with certain line leak testing, such as a 0.1 GPH line leak test.

The interior space of the fluid conduit line 16 defines an essentially fixed volume that depends on several conduit line factors, including the length and cross-sectional area of the conduit line 16, the thermal conditions of the line, as well as other factors. To meet EPA regulations, the integrity of the fluid conduit line 16 is regularly tested and the amount of any fuel leakage therefrom monitored. In this regard, the controller 28 may be configured to perform conduit line leak tests by ensuring that the dispensing unit shut off valve 32 is closed, and activating the submersible pump 14 to pressurize the conduit line 16. The controller 28 may then detect leaks by monitoring the fluid flow through the leak detector 24.

In operation, when fuel is to be dispensed from the dispensing unit 18, the controller 28 may activate the submersible pump 14 and open the dispenser unit shut off valve 30 so that fuel flows from the tank 12 through the pump manifold 20, line leak detector 24, and conduit line 16 to the dispensing unit 18, where the fuel is deposited into a vehicle fuel tank or the like. A fuel dispensing event such as just described may cause a sufficient volume of fuel to be pumped from the tank 12 to the dispensing unit 18 such that the fuel in the conduit line 16 is substantially replaced by fuel from the tank 12. As shown in FIG. 1, the fuel in the tank 12 may be stored at a level beneath the earth that is lower than the level at which the conduit line 16 is buried. In addition, the fuel may arrive in the tank 12 at various temperatures depending on the weather conditions experience by the tanker truck delivering the fuel, as well as the fuel's temperature when it is deposited into the tanker at the fuel terminal or refinery. For these reasons, the temperature of the fuel in the tank 12 may not be at the same temperature as the earth surrounding the conduit line 16. Thus, immediately after a dispensing event, the fuel in the conduit line 16 has a generally unknown thermal relationship with the environment surrounding the conduit line 16.

Assuming that there is no temperature difference between the fuel, the conduit line 16, and the conduit line surroundings, any fuel leaking out of the conduit line 16 while the submersible pump 14 is activated will be replaced by fuel flowing through the bypass line 34, which will be detected by the fluid flow detector 26. Thus, assuming the fuel in the conduit line 16 has reached thermal stability, any leaks present in the conduit line 16 will manifest themselves as a relatively steady forward fluid flow through the fluid flow detector 26.

However, if the fuel in the conduit line 16 is not yet thermally stable, thermal expansion and/or contraction of the fuel as it either absorbs heat from or releases heat to the environment may affect the amount of fuel flowing through the leak detector 24 during the line leak test. For example, if the fuel is undergoing thermal contraction due to cooling, fuel may flow in a forward direction through the leak detector 24 to compensate for the volumetric contraction of the fuel in the conduit line 16. This forward flow may be sufficient to provide a false positive leak indication in the absence of an actual leak. Conversely, fuel undergoing thermal expansion due to warming might mask a leak by providing sufficient volumetric expansion to replace any fuel leaking from the conduit line 16 during the leak test. Thus, without knowledge of the relative temperatures of the fuel in the conduit line 16 and the environment surrounding the conduit line 16, it is difficult to determine if a leak is present, and if so, how severe the leak is.

Thus, there are two unknown variables to consider when conducting a line leak test: (1) the thermal status of the fuel in the conduit line; and (2) the presence and size of a potential leak. Without knowing the first variable, i.e., the thermal relationship between the fuel in the conduit line 16 and the surrounding environment, it may be difficult to accurately determine the second variable, i.e. whether the conduit line 16 is leaking, and if so, how large the leak is.

One way of insuring that the fuel is thermally stable is to wait for a long enough period of time so that any unknown temperature differences between the fuel and the conduit line environment will be sufficiently diminished. However, this may result in an artificially long waiting period during which fuel may not be dispensed. It is therefore advantageous to be able to proactively determine the thermal status of the fuel in the conduit line 16. To this end, and in accordance with an embodiment of the invention, a method of determining when the fuel in the conduit line has reached sufficient thermal stability using reverse flow measurements is disclosed.

Unlike previous systems which employ a check valve between the tank 12 and leak detector 24 to create a closed system, one embodiment of the present invention may eliminate the check valve to allow reverse flow of fuel through the line leak detector 24 back toward the tank 12 after a conduit line pressurization event. By monitoring this reverse flow, information may be garnered about the thermal status of the fuel in the conduit line 16 relative to its surrounding environment sufficient to determine when a line leak test may be accurately performed.

Figure 2A:
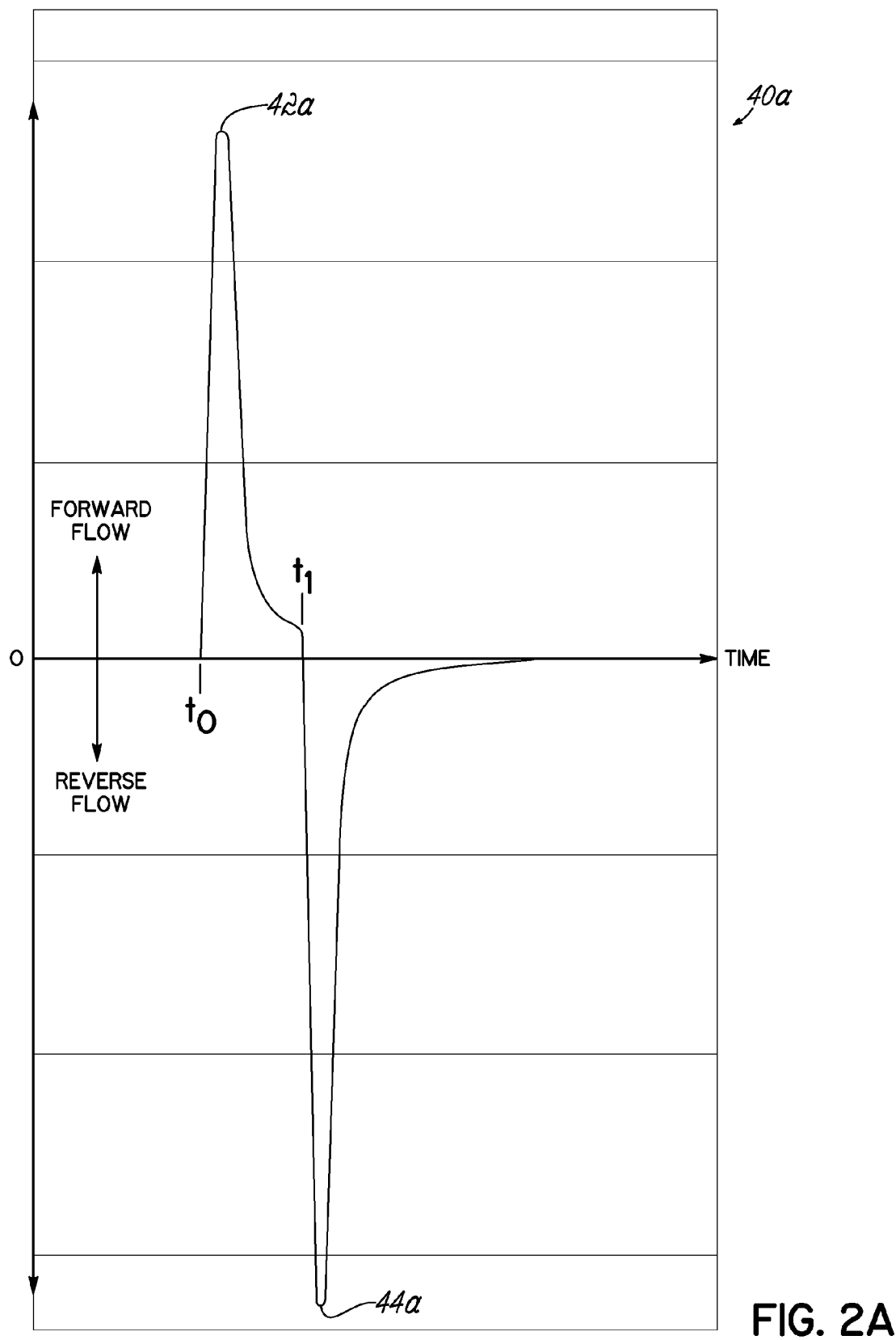
FIG. 2A is a graphical view showing an exemplary reverse flow rate signature for a conduit line containing fuel that is in thermal stability with the surrounding environment.

Referring now to FIG. 2A, a graph 40a is presented illustrating an exemplary fluid flow rate verses time plot for a reverse flow test in which the temperature of the fuel in the conduit line 16 is at thermal stability. At time $t_0$, the submersible pump 14 is activated. Because the fluid flow rate is proportional to the pressure differential across the leak detector 24, at time $t_0$, the flow rate moves upward sharply in a forward direction as the pressure on the upstream side of the line leak detector 24 is raised by the submersible pump 14. The forward flow rate reaches a peak 42a shortly after time $t_0$, after which time the pressure begins to equalize across the line leak detector 24 as fluid flows through the leak detector 24 into the conduit line 16, raising the pressure on the downstream side of the line leak detector 24. As the pressure equalizes across the leak detector 24, the forward flow demonstrates an exponential decay, which would asymptotically approach zero if the submersible pump 14 were allowed to run indefinitely. At time $t_1$, the submersible pump 14 is deactivated. Without a check valve between the line leak detector 24 and the tank 12 to prevent fuel from flowing back toward the tank 12, the pressure quickly drops on the upstream side of the leak detector 24, causing the flow to reverse and begin releasing pressure from the conduit line 16 through the line leak detector 24 and more particularly, through the by-pass line 34. The reverse flow rate thus reaches a peak 44a shortly after $t_1$. In a similar fashion as with the pressurization phase, the reverse flow exponentially decays, asymptotically approaching zero as the pressure equalizes between the downstream side and the upstream side of the line leak detector 24. This graph represents ideal reverse flow behavior when the fuel is thermally stable relative to its surroundings.

Figure 2B:
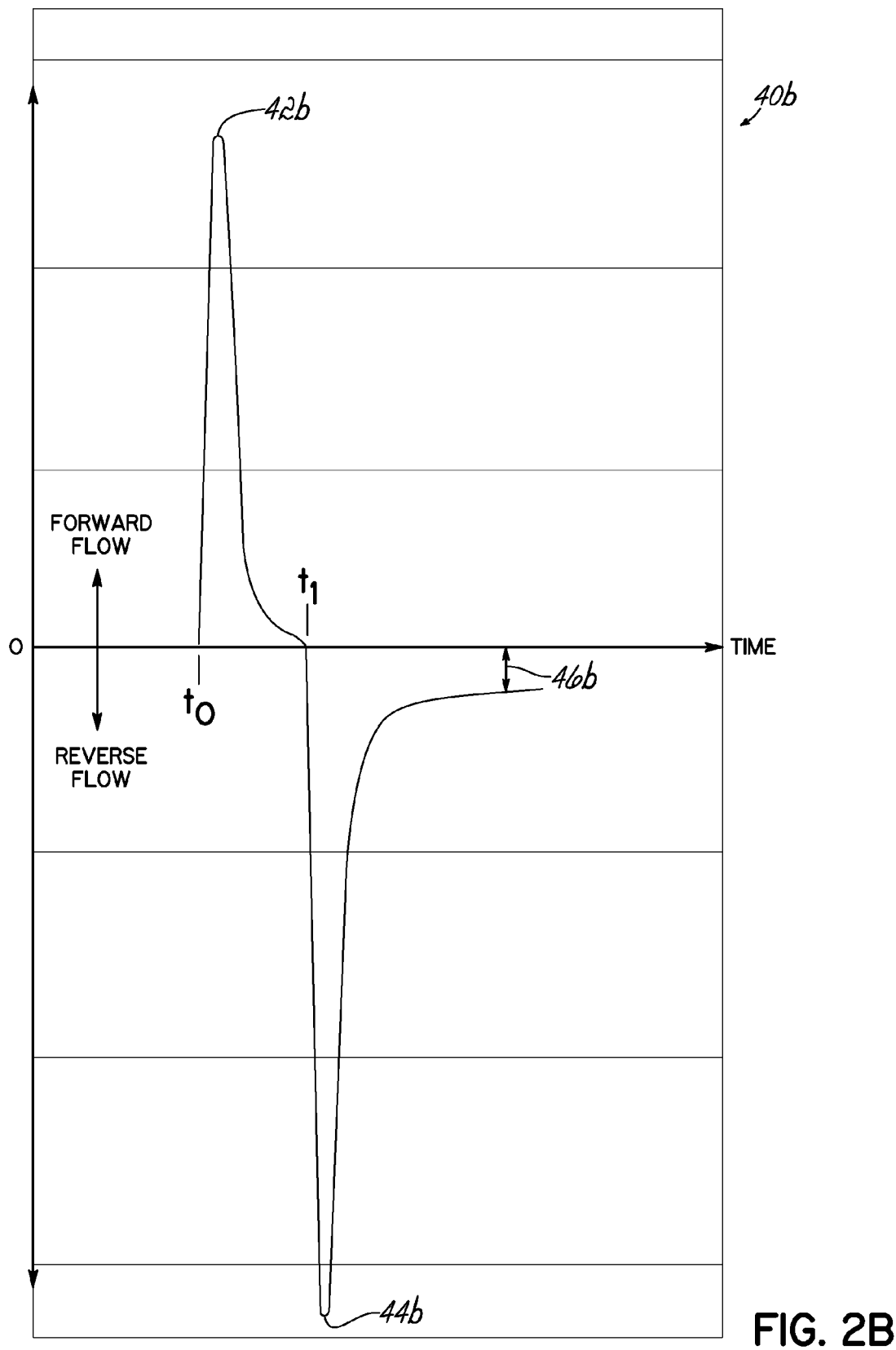
FIG. 2B is a graphical view showing an exemplary reverse flow rate signature for a conduit line containing fuel that is cooler than the surrounding environment.

Referring now to FIG. 2B, a graph 40b is presented illustrating an exemplary fluid flow rate verses time plot for a reverse flow test in which the temperature of the fuel in the conduit line 16 is lower than the surrounding environment. As previously described with regard to the graph 40a of FIG. 2A, the conduit line 16 is pressurized by activating the submersible pump 14 at time $t_0$, and then allowed to depressurize through the line leak detector 24 by deactivating the submersible pump 14 at time $t_1$. Because the peak reverse pressure across the line leak detector 24 is largely dictated by the pressure supplied by the submersible pump 14 during the conduit line pressurization phase, the peak reverse flow rate 44b in the hypothermal case illustrated in FIG. 2B will typically be about the same as the peak reverse flow rate 42a in the isothermal case. However, because the fuel in the conduit line 16 is cooler than the surrounding environment, the second law of thermodynamics dictates that the fuel absorbs heat from the surrounding environment during the reverse flow test. Further, the rate that heat is absorbed by the fuel will be proportional to the difference in temperature—or $\Delta T$—between the fuel and the surrounding environment so that the temperature of the fuel will be rising during the reverse flow test at a rate proportional to $\Delta T$.

As a result of the fuel experiencing a rising temperature during the reverse flow test, the fuel in the conduit line 16 will be undergoing thermal expansion at a rate that is also substantially proportional to ΔT. The additional volume of fuel introduced into the conduit line 16 by this thermal expansion during the reverse flow measurement period will be reflected in a reverse flow rate verses time plot—or signature—which will have a longer reverse flow duration as compared to the isothermal reverse flow rate signature shown in FIG. 2A. Due to the thermal masses involved and the rate of heat transmission, the fuel in the conduit line 16 may approach thermal stability at an exponentially decaying rate having a much longer time constant than the time constant associated with the pressure decay across the leak detector 24. The additional reverse flow associated with thermal expansion of the fuel in the conduit line 16 may vary slowly compared to the reverse flow resulting from pressurization of the conduit line 16. This relatively slowly varying reverse flow component will generally broaden the duration of the reverse flow signature as shown in FIG. 2B, as well as be characterized by a reverse flow offset 46b, so that the reverse flow does not quickly approach zero during the reverse flow test. The total rate of change in the reverse flow from the reverse flow peak 44b to the end of the test period will therefore typically be less than in the isothermal case.

Figure 2C:
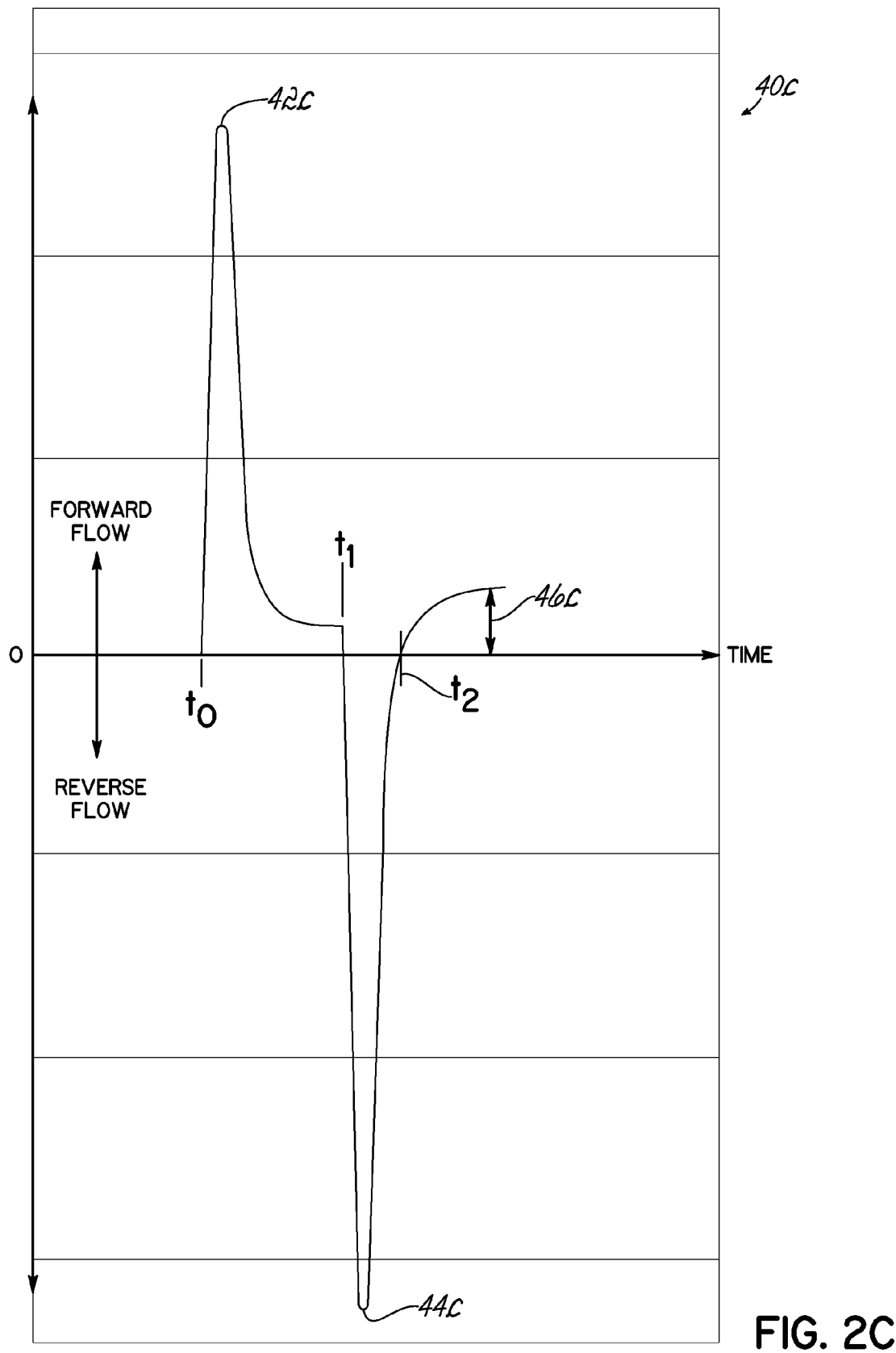
FIG. 2C is a graphical view showing an exemplary reverse flow rate signature for a conduit line containing fuel that is warmer than the surrounding environment.

Referring now to FIG. 2C, a graph is presented illustrating an exemplary fluid flow rate verses time plot for a reverse flow test in which the temperature of the fuel in the conduit line 16 is higher than the surrounding environment. As previously described with regard to FIGS. 2A and 2B, the conduit line 16 is pressurized by activating the submersible pump 14 at time $t_0$, and then allowed to depressurize through the line leak detector 24 by deactivating the submersible pump 14 at time $t_1$. As with the isothermal and hypothermal cases, the peak reverse pressure across the line leak detector 24 is largely dictated by the pressure supplied by the submersible pump 14 during the conduit line pressurization phase, so that the peak reverse flow rate 44c will typically be about the same as the peak reverse flow rates 44a, 44b in the isothermal and hypothermal cases. However, because the fuel in the conduit line 16 is warmer than the surrounding environment, the fuel will be transferring heat to the surrounding environment at a rate proportional to ΔT. Thus, the temperature of the fuel will fall during the reverse flow test at a rate substantially proportional to ΔT.

As a result of the fuel experiencing a falling temperature during the reverse flow test, the fuel in the conduit line 16 will be undergoing thermal contraction at a rate that is also substantially proportional to ΔT. The volume of fuel removed from the conduit line 16 by this thermal contraction during the reverse flow measurement period will be reflected in a reverse flow signature, which will have a generally shorter duration as compared to the isothermal reverse flow signature. For relatively large thermal expansion rates, the flow rate may cross the zero flow rate line during the reverse flow rate test, thus becoming a forward flow rate, which is shown occurring in FIG. 2C at time $t_2$. Like the hypothermal case, the forward flow rate associated with thermal contraction of the fuel in the conduit line 16 will be relatively slowly varying compared to the reverse flow resulting from pressurization of the conduit line. The forward flow resulting from thermal contraction of the fuel will thus not only shorten the duration of the reverse flow signature as shown in FIG. 2C, it will typically result in the flow rate becoming a forward flow after a sufficient amount of time, so that the total rate of change in the reverse flow from the reverse flow peak 44c to the end of the test period may be greater than in the isothermal case.

Based on this expected reverse flow behavior, it has been determined that by performing multiple reverse flow tests over a period of time and comparing the resulting reverse flow signatures, the thermal status of the fuel in the conduit line 16 relative to the surrounding environment can be determined independently of a fuel leak that may or may not be present in the conduit line 16. To this end, the controller 28 may be configured to conduct reverse flow tests and compare the resulting signatures to determine the level of thermal activity in the fuel conduit line 16.

Figure 3:
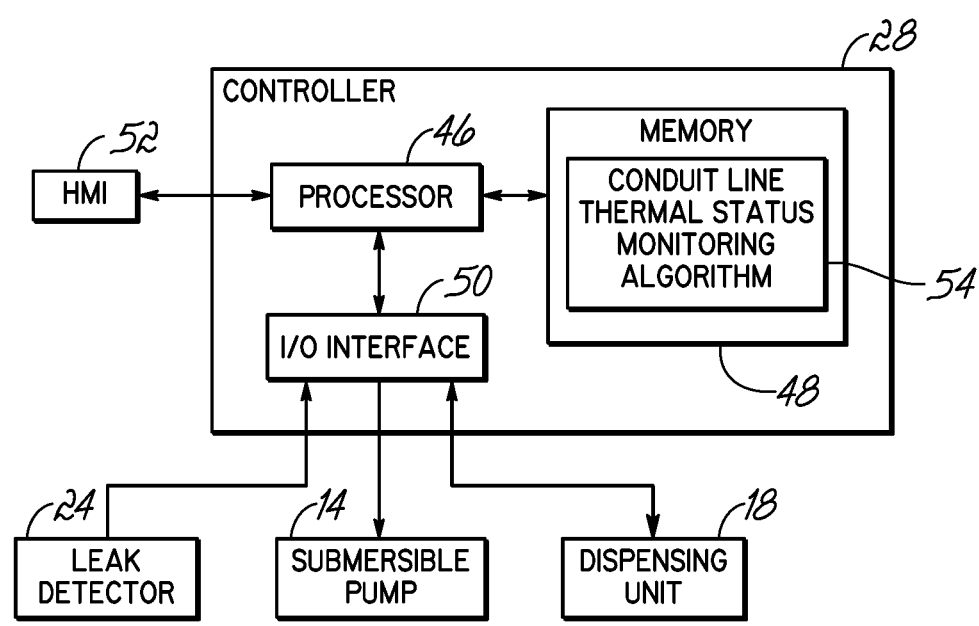
FIG. 3 is block diagram of a controller shown in FIG. 1 in accordance with an embodiment of the invention.

Referring now to FIG. 3, and in accordance with an embodiment of the invention, a block diagram is presented illustrating the controller 28 in more detail. The controller 28 may be implemented using one or more processors 46 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 48. Memory 48 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information. The memory 48 may also be integrated into the processor 46.

An Input/Output (I/O) interface 50 may employ a suitable communication protocol for communicating with at least the leak detector 24, submersible pump 14, and one or more dispensing units 18. To this end, the I/O interface 50 may include one or more analog to digital converters (ADCs) (not shown) to convert analog signals received by the I/O interface 50 into a form suitable for processing by the processor 46, as well digital to analog converters (DACs) for converting digital signals from the processor into analog signals. The I/O interface 50 may also include analog signal conditioning circuitry, such as buffer amplifiers, voltage level translators, drivers and/or power switches, so that the processor 46 may selectively activate the various components comprising the fuel dispensing system 10, such as the submersible pump 14 and dispensing unit shut off valve 30. The I/O interface 50 may also include a data port (not shown), such as an Ethernet, USB, FireWire, modem, RS-232, or other suitable data port to allow communications between the controller and/or a network or other device, such as a computer and/or data storage device.

A human machine interface (HMI) 52 may be operatively coupled to the processor 46 of controller 28 in a known manner. The HMI 52 may include output devices, such as alphanumeric and/or graphical displays, a touch screen, and other visual indicators, and input devices and controls, such as an alphanumeric keyboard, a pointing device, keypads, pushbuttons, control knobs, etc., capable of accepting commands or input from the operator and transmitting the entered input to the processor 46.

Processor 46 may operate under the control of an operating system, and executes or otherwise relies upon computer program code or logic embodied in various computer software applications to read data from and transmit instructions or signals to the various components operatively coupled to the controller 28 through I/O interface 50. The resident computer program code executing on the controller 28 as a set of instructions may include a thermal status monitoring algorithm (TSMA) 54 operative to perform reverse flow testing. To this end, the TSMA 54 may be adapted to collect and store in memory 48 flow data received from the leak detector 24 during reverse flow testing, and to produce or calculate one or more reverse flow signatures based on the data collected. Once two or more reverse flow signatures have been obtained, the TSMA may compare the signatures to determine if the fuel in the conduit line exhibits sufficient thermal stability to conduct a line leak test.

To determine the thermal status of the fuel in the conduit line 16, when a line leak test is desired, the TSMA 54 will first conduct a sequence of two or more reverse flow signature tests over a period of time. The TSMA 54 will then compare the reverse flow signatures obtained in the two or more reverse flow tests to determine the thermal status of the fuel in the conduit line 16 relative to the surrounding environment. Because the effects of any leakage that may be present during the tests will remain relatively constant between readings, thermal effects will manifest themselves through changes in the reverse flow signatures.

Alternatively, the TSMA 54 may conduct a single reverse flow test, and compare the resulting reverse flow signature to a baseline signature representing a known reverse flow signature for the isothermal case. If TSMA 54 determines that the fuel has not reached a sufficient state of thermal stability to conduct a line leak test, the TSMA 54 will conduct additional reverse flow tests, comparing the reverse flow signatures thereby obtained until the results indicate that a line leak test may be conducted.

Figure 4:
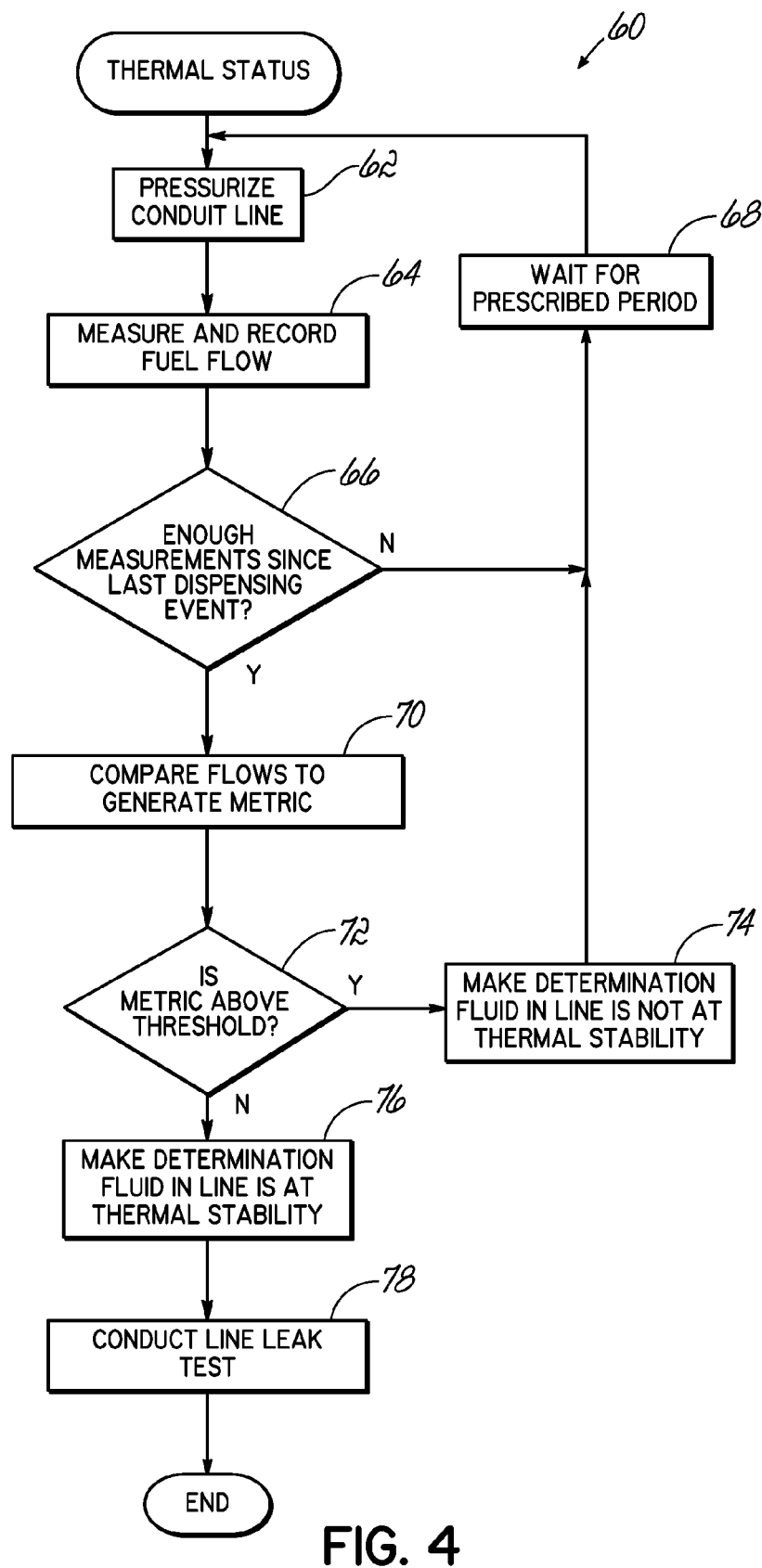
FIG. 4 is a flow chart of a method of implementing reverse flow testing in accordance with an embodiment of the invention.

FIG. 4 provides a flowchart 60 illustrating a sequence of operations for the controller 28 that may be used to implement the TSMA 54. In block 62, the controller 28 takes steps to pressurize the conduit line 16. Pressurizing the conduit line 16 may include the steps of shutting the dispenser unit shut off valve 30 and activating the submersible pump 14. The submersible pump 14 may operate to raise the pressure on the upstream side of the leak detector 24, so that fuel flows through the leak detector 24 into the conduit line 16. Because the conduit line 16 may have a substantially fixed volume and the fuel may not significantly compress due to the pressures present in the line 16, it may be that only a relatively small amount of fuel flows into the conduit line 16 before the pressure across the valve 32 is equalized and the forward flow of fuel stops or slows appreciably. In a typical line leak detector 24, the forward fuel flow required to pressurize the conduit line 16 may be accommodated by the bypass line 34, so that the valve 32 may remain closed during conduit line pressurization. In addition, because only a small amount fuel flows from the tank 12 into the conduit line 16 during pressurization, the temperature of the fuel in the conduit line 16 is largely unaffected by the pressurization step.

A relatively short amount of time after the submersible pump 14 is activated, such as within about 10 minutes, the pressure in conduit line 16 will be sufficiently stable to begin the reverse flow step, and the TSMA 54 will proceed to block 64, deactivating the submersible pump 14 in order to measure and record the resulting fuel flow. When the submersible pump 14 is deactivated, the pressure on the upstream side of the leak detector 24 drops back to its quiescent level relatively quickly, creating a positive pressure difference between the downstream and upstream sides of the leak detector 24, which may be in the range of about 10 to 20 pounds per square inch ("PSI"). As the pressure on the upstream side of the leak detector 24 drops below the pressure on the downstream side, fuel will begin to flow in a reverse direction through the leak detector 24, such as through the bypass line 34, where it will be detected by the fluid flow detector 26. Over time, the reverse flow reduces the pressure differential across the leak detector 24 until the flow rate approaches a horizontal asymptote representing a relatively constant flow rate (e.g., zero, positive, or negative). During this time, the controller 28 will receive the data from fluid flow detector 26 through the I/O interface 50. In some embodiments, the reverse flow monitoring period may be under 5 minutes. However, it will be understood that this period may vary significantly depending on multiple factors, such as the size, length, and rigidity of the fuel conduit line 16.

The controller 28 may store the reverse flow data in memory 48 as it is received, or the controller 28 may process the data in real time, such as by integrating the detected reverse flow rate over time to accumulate the volume of fuel flowing through the leak detector 24 during all or a part of the reverse flow event. The resulting reverse flow signature may thus include a series of data points representing a plot of the reverse flow rate verses time, the volume of fuel that flows through the leak detector 24 during a specified period of time during the reverse flow test, or any other reverse flow metric useful in comparing the amount and/or rate of reverse fuel flow through the leak detector 24 for reverse flow tests conducted at different times. The reverse flow signature thus captures a snapshot of the thermal activity of the fuel in the conduit line at a particular time that can be compared to later acquired reverse flow signatures. Advantageously, this allows the TSMA 54 to compare the thermal activity of the fuel at different times separated by relatively long periods, such as hours, by simply comparing reverse flow signatures. This avoids having to continually run the submersible pump 14 for long periods of time. In contrast, systems that rely on forward flow measurements to detect leaks may require that the submersible pump 14 remain activated for the entire testing period—which may last for hours depending on the thermal state of the fuel relative to the surrounding environment—to maintain constant pressure in the conduit line 16. Thus, the TSMA 54 may save energy and reduce wear and tear on the pump 14 as compared to systems that look strictly at forward flow in order to detect leaks.

In block 66, the controller TSMA 54 determines how many measurements have been taken since the last time fuel has been dispensed, and whether or not this is enough measurements to generate a thermal status metric. If not, ("No" branch of decision block 66), the TSMA 54 may proceed to block 68, where the TSMA 54 may pause for a period of time before conducting another reverse flow test.

As previously discussed, dispensing events as well as any other events which might expect to interfere with the thermal stability of the fuel may cause a "reset", so that only measurements taken subsequent to the event are compared to generate a thermal metric.

The duration of the pause may be constant, or it may be adjusted based on the results of previous reverse flow tests. For example, tests indicating that the fuel in the conduit line will require a significant amount of time to reach thermal stability may result in a longer wait before repeating the reverse flow test, while tests indicating the fuel is close to thermal stability, or that provide insufficient data to make a determination, may result in the TSMA 54 conducting another reverse flow test almost immediately. In cases where the reverse flow test is repeated without introducing an additional delay, reverse flow tests may be conducted every 15 to 30 minutes, depending on the cycle time of the submersible pump and reverse flow monitoring periods. If fuel has not been dispensed in the aforementioned time period, the TSMA will proceed to block 70 ("Yes" branch of decision block 66).

In block 70, the reverse flow signature for the current reverse flow test is compared to the reverse flow signature for one or more previous reverse flow tests to produce a thermal status metric. By way of example, the TSMA 54 may produce the thermal status metric by calculating the total volume of the reverse flow through the leak detector 24 for the current and previous reverse flow tests, and calculate a difference between them. This difference in total volume between the two most recent flow volumes can then be compared to the previous difference (that is, the difference between the previous flow volume measurement and the flow volume measurement directly preceding it).

Continuing the example, the TSMA may then use the change between the last two differences as the thermal status metric, expressed as a percentage. The smaller the change, the more thermally stable the fuel is understood to be. Thus, the thermal status metric may be used to determine if the fuel has reached sufficient thermal stability (e.g.—when there is little or no change in the reverse flow signature between tests) to allow a line leak test to be conducted, as well as potentially giving an indication as to how long it may be before thermal stability is achieved.

Alternatively, the thermal status metric may be determined by comparing the current reverse flow signature to a reverse flow signature known to correspond to a reverse flow rate test conducted with the fuel at thermal stability (e.g., FIG. 2*a*).

In block 72, the thermal status metric is compared to a threshold value, and if the thermal status metric is greater than the threshold value ("Yes" branch of decision block 72), the TSMA 54 makes a determination that the fuel in the conduit line 16 is not sufficiently close to thermal stability to allow a line leak test to be performed at block 74 and proceeds to block 68, where it waits to perform another reverse flow test as previously described. If the thermal status metric is less than or equal to the threshold ("No" branch of decision block 72), then the TSMA 54 proceeds to block 76, where a determination is made that the fluid in the conduit line is sufficiently close to thermal stability so that a line leak test may be performed.

Using the example above wherein the thermal status metric is a percentage comparison between differences in flow volume, a threshold value of less than 10%, more preferably less than 7%, and most preferably less than 5% may be used. If 5% is used, for example, in order to arrive at a conclusion of thermal stability, three measurements would need to be taken between dispensing events, and the difference in flow volume between the second and third measurements would need to be within 5% of the difference in flow volume between the first and second measurements.

After the TSMA 54 makes a determination that the fuel in the conduit line 16 has sufficient thermal stability to conduct a line leak test (block 76), the controller 28 may conduct a line leak test using conventional methods as known in the art (block 78). By way of example, the controller 28 may conduct a line leak volume test by activating the submersible pump 14 for a period of time sufficient to stabilize the pressure in the conduit line 16, such as about 10 minutes, and then monitoring the forward flow rate for sufficient period to detect even a slow leak. The leak test itself may take as much as twelve hours.

Figure 5:
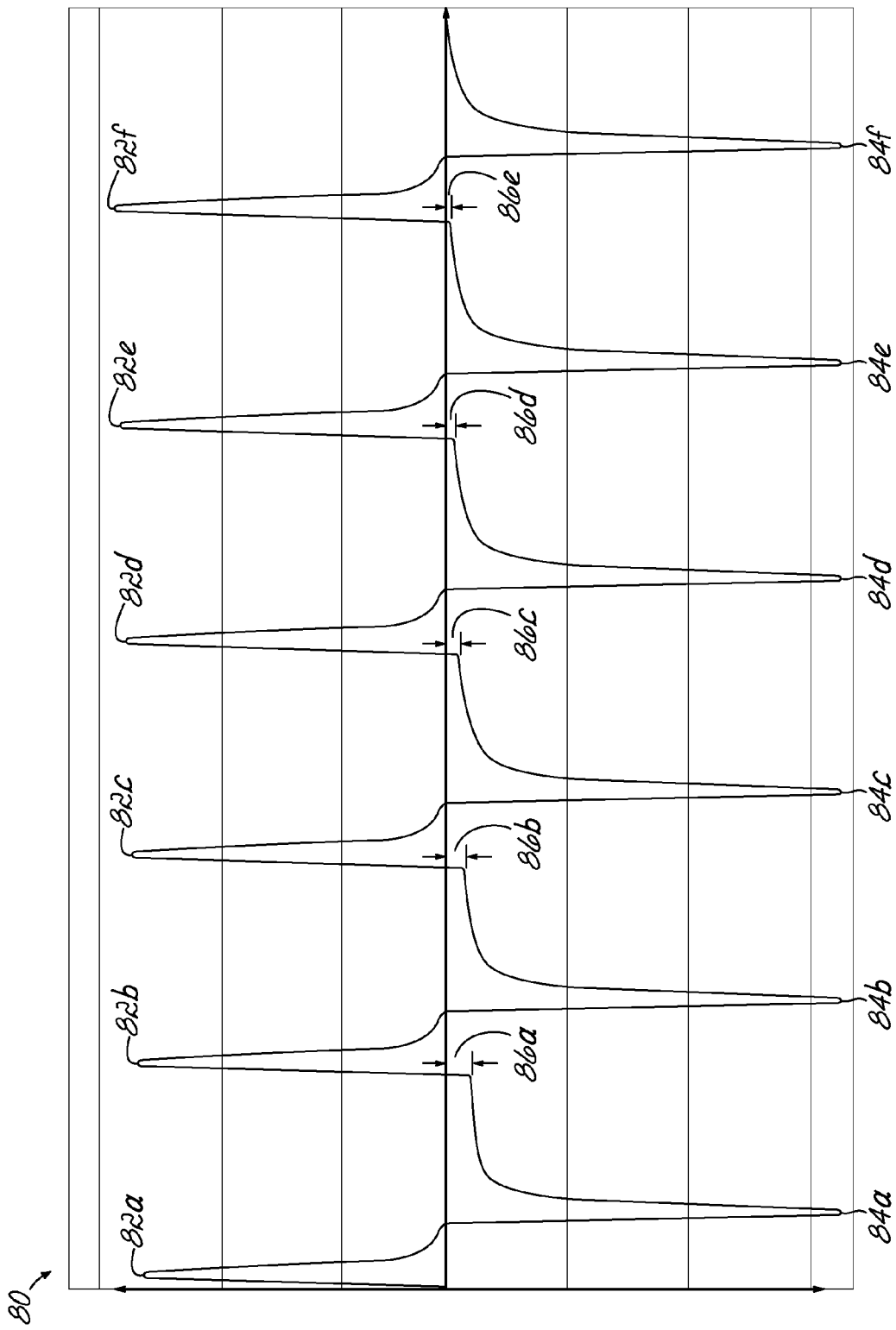
FIG. 5 is a graphical view showing a progression of sequential reverse flow rate measurements for a conduit line reaching thermal stability.

An illustration of the data associated with one set of thermal testing cycles is shown on the chart 80 of FIG. 5. As above, each forward flow peak 82 (labeled 82*a*, 82*b*, etc. to denote successive testing cycles) represents the activation of the STP 14, and subsequent deactivation of the STP 14 allows for the reverse flow including the point 84 (again labeled 84*a*, 84*b*, etc.). The first cycle shows a relatively prominent offset 86*a*, which is recorded. When the second cycle produces an offset 86*b* which still represents significant fluid flow but is greatly reduced from the first offset 86*b*, this may be identified as characteristic of thermal fluid expansion, resulting in a diagnosis that the fuel is not yet thermally stable. Further cycles result in decreasing offsets 86*c*, 86*d*, and 86*e*. At some point in the process, the TSMA 54 identifies the data recorded during a cycle as characteristic of a fuel line for which thermal expansion will not affect testing. A leak test may then be performed on the line by activating the STP 14 and measuring any persisting forward flow, or otherwise using the detector 24 as appropriate.

While the present invention has been illustrated by a description of various preferred embodiments and while these embodiments have been described in some detail, it is not the intention of the Applicant to restrict or in any way limit the scope of the appended claims to such detail. For example, the configuration of the line leak detector may be such that fluid flow through the detector may be accurately determined without the use of bypass lines or primary flow path valves, in which case the bypass line and primary flow path valve may be omitted. Furthermore, the system may use historical data on reverse flow signatures to determine a baseline reverse flow signature associated with fuel that is thermally stable, so that the thermal status of the fuel in the conduit line may be determined after a single reverse flow test. Historical data may also be used to estimate future values of $\Delta T$ in order to select a time when thermal stability will be reached relatively quickly to minimize the down time required to conduct a line leak test. In addition, based on historic and/or current reverse flow signatures, a sufficiently accurate estimate of the existing rate of thermal expansion and/or contraction of the fuel in the conduit line may be determined so as to allow the controller to compensate for the thermal expansion and/or contraction, thus allowing accurate line leak tests to be conducted without waiting for the fuel in the conduit line to reach thermal stability.

In view of the above, additional advantages and modifications will readily appear to those skilled in the art. The various features of the invention may be used alone or in numerous combinations depending on the needs and preferences of the user.

What is claimed is:

1. A method for determining the thermal status of a fuel dispensing system comprising a tank, a pump, a fuel line, a dispensing unit, and forward and reverse flow directions defined by the direction of fuel flow from the tank through the fuel line to the dispensing unit, the method comprising:
   activating the pump in order to move fuel forward into the fuel line while the dispensing unit is closed, pressurizing the fuel line;
   after activating the pump to pressurize the fuel line, deactivating the pump to allow fuel to reverse flow in order to leave the fuel line;
   after deactivating the pump, measuring the flow of fuel to generate a first set of measurements, the measurements distinguishing between forward and reverse flow; and
   determining the thermal status of the system based on the first set of measurements.

2. The method of claim 1, further comprising:
   after deactivating the pump and measuring the flow of fuel, reactivating the pump in order to pressurize the fuel line again;
   after reactivating the pump, deactivating the pump again;
   after deactivating the pump again, measuring the flow of fuel again to generate a second set of measurements;
   wherein determining the thermal status of the system includes comparing the first and second sets of measurements.

3. The method of claim 2, wherein determining the thermal status of the system further includes:
- calculating a first difference in total flow volume between the first set of measurements and the second set of measurements;
- calculating a second difference in total flow volume between two sets of measurements wherein at least one of the two sets is neither the first nor the second set of measurements;
- comparing the first difference to the second difference in order to generate a thermal status metric; and
- determining the thermal status according to whether the thermal status metric exceeds a threshold value.

4. The method of claim 3, wherein the thermal status is determined to be stable only if the value of the first difference is within 10% of the value of the second difference.

5. A method for detecting leaks in a fuel line having a forward and reverse flow direction, fuel entering the fuel line by means of a pump, the method comprising:
- measuring the flow entering the fuel line in the forward direction and leaving the fuel line in the reverse direction, the measurements distinguishing between forward and reverse fuel flow;
- determining the thermal status of the fuel line based on measurements of the flow taken when the pump is not active; and
- identifying a leak based on measurements of the flow taken when the pump is active and on the thermal status of the fuel line.

6. The method of claim 5, wherein determining the thermal status of the fuel line includes measuring the fuel flow to identify a pattern of fuel flow characteristic of the fuel being substantially in thermal stability with the surroundings of the fuel line; and
- wherein the leak is only identified based on measurements of the flow taken after the measurements in which the pattern characteristic of thermal stability is identified.

7. A method for determining the thermal status of a fuel dispensing system comprising:
- monitoring a reverse flow through a fluid flow detector; and
- determining the thermal status of the fuel dispensing system based on information gained from the monitoring of the reverse flow.

8. The method of claim 7, further comprising:
- determining whether to run a line leak test based on the determined thermal status of the system.

9. The method of claim 8, further comprising:
- measuring a first, a second, and a third volume of flow through the detector;
- comparing the difference between the first and second volumes to the difference between the second and third volumes; and
- determining whether the fuel has reached thermal stability based on whether the compared differences are within a predetermined threshold value of each other.

10. The method of claim 9, wherein the fuel is determined to have reached thermal stability if the compared differences are within 10%.

* * * * *